United States Patent
Morris (10) Patent No.: US 7,376,699 B2
(45) Date of Patent: May 20, 2008

(54) SYSTEM AND METHOD FOR SENDING AN IMAGE FROM A COMMUNICATION DEVICE

(75) Inventor: Robert P. Morris, Raleigh, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 258 days.

(21) Appl. No.: 11/003,849

(22) Filed: Dec. 2, 2004

(65) Prior Publication Data

US 2006/0123086 A1 Jun. 8, 2006

(51) Int. Cl.
*G06F 15/16* (2006.01)
*G06F 12/00* (2006.01)

(52) U.S. Cl. .................. 709/203; 709/223; 709/217

(58) Field of Classification Search ............. 709/203, 709/206, 223, 217
See application file for complete search history.

(56) References Cited

U.S. PATENT DOCUMENTS

| | | | |
|---|---|---|---|
| 4,849,811 A * | 7/1989 | Kleinerman | 372/240.01 |
| 5,666,159 A * | 9/1997 | Parulski et al. | 348/211.2 |
| 5,978,806 A | 11/1999 | Lund | |
| 6,049,796 A * | 4/2000 | Siitonen et al. | 707/3 |
| 6,160,926 A * | 12/2000 | Dow et al. | 382/313 |
| 6,464,140 B1 * | 10/2002 | Weigel | 235/462.07 |
| 6,611,291 B1 * | 8/2003 | Dow et al. | 348/333.01 |
| 6,715,003 B1 | 3/2004 | Safai | |
| 6,959,328 B1 * | 10/2005 | Gillaspy et al. | 709/220 |
| 2002/0054224 A1 | 5/2002 | Wasula | |
| 2003/0040327 A1 * | 2/2003 | Park | 455/466 |
| 2003/0085989 A1 | 5/2003 | Tay | 348/14.02 |
| 2003/0189654 A1 * | 10/2003 | Kage et al. | 348/239 |
| 2004/0005915 A1 | 1/2004 | Hunter | |
| 2004/0062374 A1 | 4/2004 | Lund | |
| 2004/0109063 A1 * | 6/2004 | Kusaka et al. | 348/207.1 |
| 2004/0203608 A1 | 10/2004 | Osann | |
| 2004/0240434 A1 | 12/2004 | Sato et al. | |
| 2004/0263660 A1 * | 12/2004 | Wang et al. | 348/333.01 |
| 2005/0021803 A1 * | 1/2005 | Wren, III | 709/231 |
| 2005/0193117 A1 | 9/2005 | Morris | |
| 2006/0103762 A1 * | 5/2006 | Ly et al. | 348/584 |
| 2006/0144950 A1 * | 7/2006 | Johnson | 235/472.02 |

OTHER PUBLICATIONS

EE gifts for the holiday, Jones, W.D., IEEE-Xplore, vol. 37, issue 12, ISN 0018-9235, Dec. 2000, p. 31-35.*

* cited by examiner

*Primary Examiner*—Zarni Maung (57) ABSTRACT

A system and method for sending an image are described. An exemplary system includes a communication device having an image capture device is configured to capture the image. A memory is coupled to the image capture device and is configured to maintain an address book having an address of a recipient. An input system is coupled to the memory and is configured to receive an input indicating a recipient. An image transmit manager is coupled to the input system and is configured to receive the input and associate the input to the address of the recipient, and in response to associating the input with the address for the recipient, to automatically transmit the image to the recipient using the address.

45 Claims, 5 Drawing Sheets

SYSTEM AND METHOD FOR SENDING AN IMAGE FROM A COMMUNICATION DEVICE

FIELD OF THE INVENTION

The present invention relates to mobile communication devices, and more particularly to a system and method for sending an image from a communication device.

BACKGROUND OF THE INVENTION

Hand held communication devices, such as mobile telephones and PDAs, currently are adapted to incorporate a variety of functions and to support multiple mechanisms of communication. For example, a mobile phone can provide traditional wireless telephone functions, while also providing the ability for a user to capture digital images and the ability to transmit or receive captured images for display on the phone's LCD. Indeed, the modern mobile phone allows the user to send and receive text messages, audio and video clips, graphics and images via electronic mail, Short Message Service (SMS), or Multimedia Message Service (MMS), in addition to simply talking to another caller.

Each communication mechanism is associated with a particular addressing scheme, such as a phone number for phone calls, an email address for electronic messages, or an http URL for posting images. The personal communication devices that support a wide range of communication mechanisms generally treat each mechanism separately.

One primary limitation of conventional communication devices, such as camera phones, is that address entry is cumbersome and tedious using the limited keys available. For example, assume the user of the camera phone sees an image that he desires to transmit to a friend. The user must take a picture of the image and then enter the friend's email address for the image to be delivered via electronic mail. Then, the picture must be attached to the email and the email sent. Each of the communication mechanisms require multiple steps in order to send the image.

Accordingly, a need exists for an improved system and method that allows a user of a communication device to capture an image and send the image from the communication device. The present invention addresses such a need.

BRIEF SUMMARY OF THE INVENTION

The present invention provides a system and method for sending an image from a communication device without the inconvenience of conventional systems. Aspects of the present invention include a communication device having an image capture device that is configured to capture the image. A memory is coupled to the image capture device and is configured to maintain an address book having an address of a recipient, the address specifying a transmission format. An input system is coupled to the memory and is configured to receive an input indicating a recipient. An image transmit manager is coupled to the input system and is configured to receive the input and match the input to the address of the recipient, and to transmit to the recipient the image using the transmission format specified by the address.

According to a method and system disclosed herein, the present invention simplifies image transfer by allowing a use of the communication device to send an image to a recipient, for example, by entering the phone number of the recipient or looking up their name in an address book. The communication device may send the image using multimedia messaging system (MMS) format to the recipient over their phone line. The extra steps of having to type in an email address, attach the image, and so on are eliminated. Alternatively, the communication device may lookup in an address book that the recipient prefers to receive images via email. If the device is so equipped, an email with the image attached will be automatically generated and sent upon entering the recipient's phone number, for example. In another embodiment, the device may not be equipped to transmit via email, so the device sends the image to a proxy server, which is so equipped and automatically transmits the email with attachment.

DETAILED DESCRIPTION OF THE INVENTION

The present invention relates to allowing a user of a communication device to capture an image and send the image from the communication device without the burdens on conventional systems. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
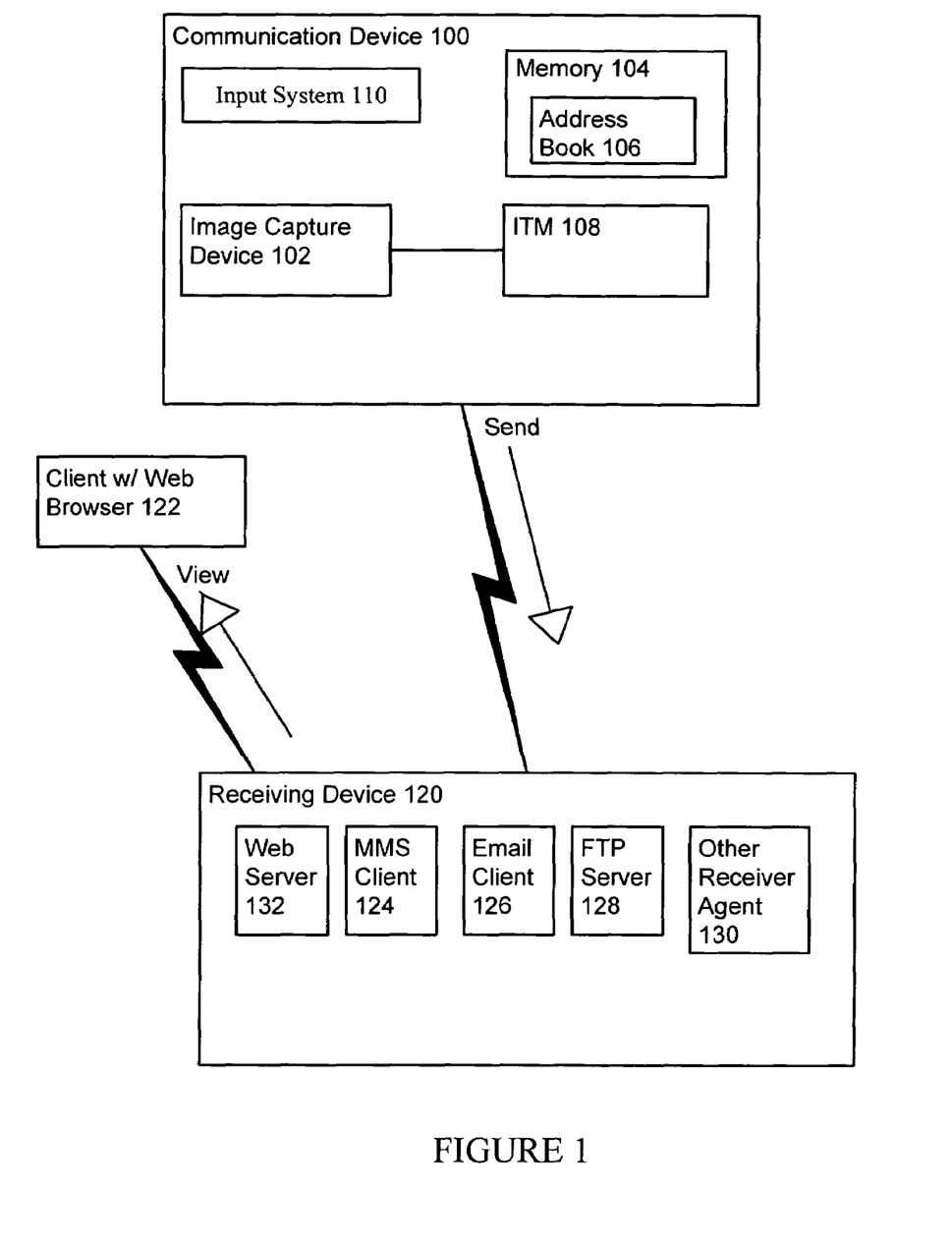
FIG. 1 is a block diagram illustrating one embodiment of a communication device for conveniently sending an image.

FIG. 1 is a block diagram illustrating one embodiment of a communication device for conveniently sending an image. Communication device 100 includes an image capture device 102, for example a digital camera built in to a mobile phone. Mobile phones have a memory 104 and an address book 106 in which names and associated phone numbers may be stored. An image transmit manager (ITM) 108 manages and transmits images from the image capture device 102.

According to the preferred embodiment, a user may enter, into a communication device 100, a phone number of a recipient. The user may also use an image capture device 102 contained within communication device 100 to capture an image. Then, the user may automatically transmit the image to the phone number of the recipient. Communication device 100 may receive the image or the phone number first.

Figure 2:
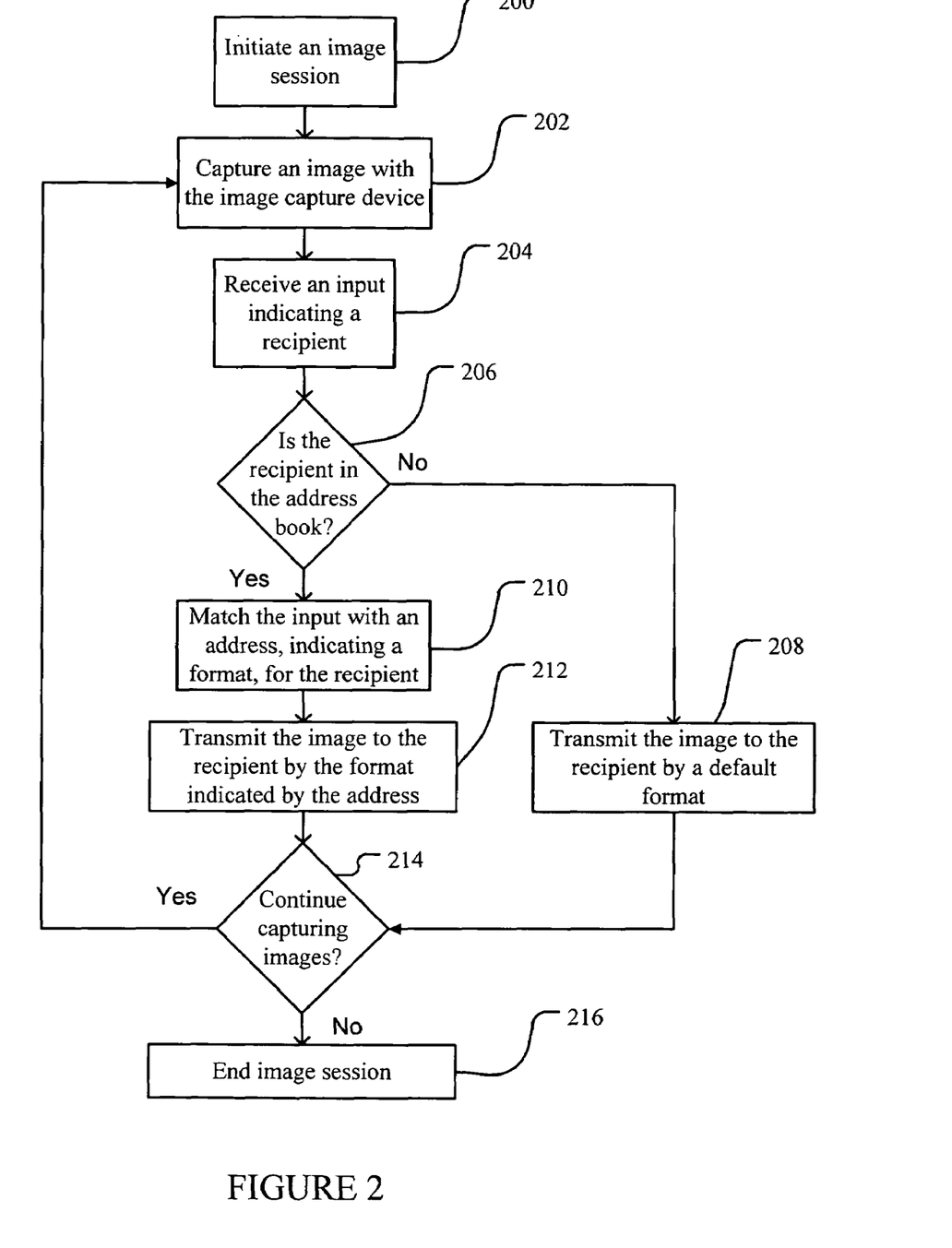
FIG. 2 is a flow diagram illustrating one method of sending an image with the system of FIG. 1.

FIG. 2 is a flow diagram illustrating one embodiment of a method of sending an image with the system of FIG. 1. FIG. 2 will be discussed in conjunction with FIG. 1. In block 200, a user of communication device 100 initiates an image session. During the image session, the user takes several pictures (captures images) with image capture device 102, as in block 202. The images may be stored in memory 104, which may include a removable media, nonvolatile and volatile RAM.

After taking the pictures, assume the user decides to send those to his friend Bob, who has a camera-phone with a phone number of 555-1234. Still in the same image session, the user enters Bob's phone number or selects Bob's entry from the device's address book. The result of this is that in block 204, the communication device 100 receives an input indicating a recipient (Bob) through a name, a phone number, or an address, for example. The user may look Bob up from the address book 106, or from a list of previously made or received calls, or use a short-cut (hot) key, or manually enter the phone number into the input system (for example, a numeric keypad) 110 on communication device 100, or speak Bob's name into input system 110 (for example, a microphone) if the communication device 100 supports voice recognition, or use some other form of input indicating a recipient (Bob). In this example, the user enters Bob's phone number, 555-1234.

The order of blocks 202 and 204 may be reversed, i.e. block 204 may occur before or after block 202. The invention is not limited to whether images are captured first or a recipient is input to communication device 100.

Image transmit manager (ITM) 108 receives the indication and in block 206 determines if the recipient (or phone number) is in the address book 106 or elsewhere in memory 104. If '555-1234' is not in the address book 106, then in block 208 the ITM 108 transmits the image to the recipient by a default format. One default format for transmitting the images is with multimedia messaging system (MMS) format.

Otherwise, if the recipient is in the address book 106, then ITM 108 matches the input (phone number '555-1234') with an address (Bob's phone number), which is in address book 106, as in block 210. Included with Bob's number is Bob's preference for receiving images in MMS format at his phone. Alternatively, other transmission formats may be used, for example instant messaging (IM), email, hyper-text transfer protocol (HTTP), and file transfer protocol (FTP). In this example, communication device 100 supports email, MMS, and HTTP formats.

In block 212, ITM 108 automatically transmits the images to the number 555-1234 using MMS format. Referring again to FIG. 1, receiving device 120 may be a personal computer, a personal digital assistant (PDA), or a server hosting email accounts, for example. Receiving device 120 may be enabled with a web browser 122, an MMS client 124, and an email client 126. A web server 132 may be remotely located to receiving device 120 and may support browser 122, which may be a remote client or located in receiving device 120. Receiving device 120 may further include, for example, FTP server 128 or some other receiving agent 130. Continuing with the above example, Bob's camera-phone is enabled with a web browser 122, an MMS client 124, and an email client 126. Bob may receive the images and view them using the MMS client 124.

Referring again to FIG. 2, in block 214 the user of communication device 100 decides whether to continue capturing images. In this example, the user decides to take another picture, wanting to send all the images to his own PC. The user could have the option of sending just the images captured since his transmission to Bob, or he could send all the images since the image session began. The user decides to send only the most recently taken image and dials his own number. ITM 108 looks up the number the user enters (his own) and in the address book 106 the preferred format is email, so an email with the image is sent to the user's email address. Finally, the user ends the image session, in block 216.

In one embodiment, communication device 100 may have given the user the option of establishing a phone connection with Bob after the images were sent. However, having an ongoing connection is unnecessary in order to send images.

After beginning an image session, all the pictures taken during the session are available for convenient transmitting to whatever phone number a user enters into communication device 100. Other pictures may be stored in memory and may be available for transmitting through a phone number or other input indicating a recipient, but the default status of communication device 100 is to transmit pictures taken during the current image session, rather than pictures taken earlier.

One of ordinary skill in the art will recognize that an image or images includes video and audio capture, and is not limited to pictures. Furthermore, block 204 may precede block 202, in that a user of communication device 100 may enter an input indicating a recipient (block 204) prior to capturing an image with the image capture device 102. If block 204 precedes block 202 then block 214 may loop back to block 204, rather than to block 202.

The embodiments described above can allow for images to be automatically transferred to a recipient while the communication device is operating in an image capture mode. That is, the transfer can occur while the device is configured to capture an image using its image capture device. While in the capture mode, selected recipients can be sent images automatically using an address associated with receiving images, such as an email address, FTP server, web address, and the like. In other modes of operation, such as phone mode, the selection of a recipient can indicate that a voice call is to be established with the recipient. The communication device can be configured to support the sending of captured images or the placing of a voice call automatically to recipients, regardless of the mode of operation. That is, the user can capture images and place phone calls without having to change from a capture mode to a voice mode, and vice versa.

For example, the user may capture a series of images, then select a contact entry or enter a phone number. To indicate that the images are to be sent to the selected contact(s), the device's connection (or call) button may be configured to respond to double-clicks by sending the images to the recipients using the address associated with receiving images. Similarly the call button can be configured to respond to a single press (or press-and-hold) by establishing a phone connection with a recipient using a second address associated with receiving a voice call, such as a telephone number or internet address. It will be understood that the address for receiving images and the address for receiving voice calls can be the same address or can be different addresses based on the recipient's or sender's preferences.

Alternately, the communication device may have separate buttons or UI controls to indicate that images are to be sent to the recipient rather than a phone call placed. In another example, the user may select a recipient(s) or enter one or more phone numbers, then capture a series of images before pressing the call button. When the call button is pressed, the images are sent to the recipients. If no images had been captured after specifying the recipients, a phone call could be placed instead, as usual.

Figure 3:
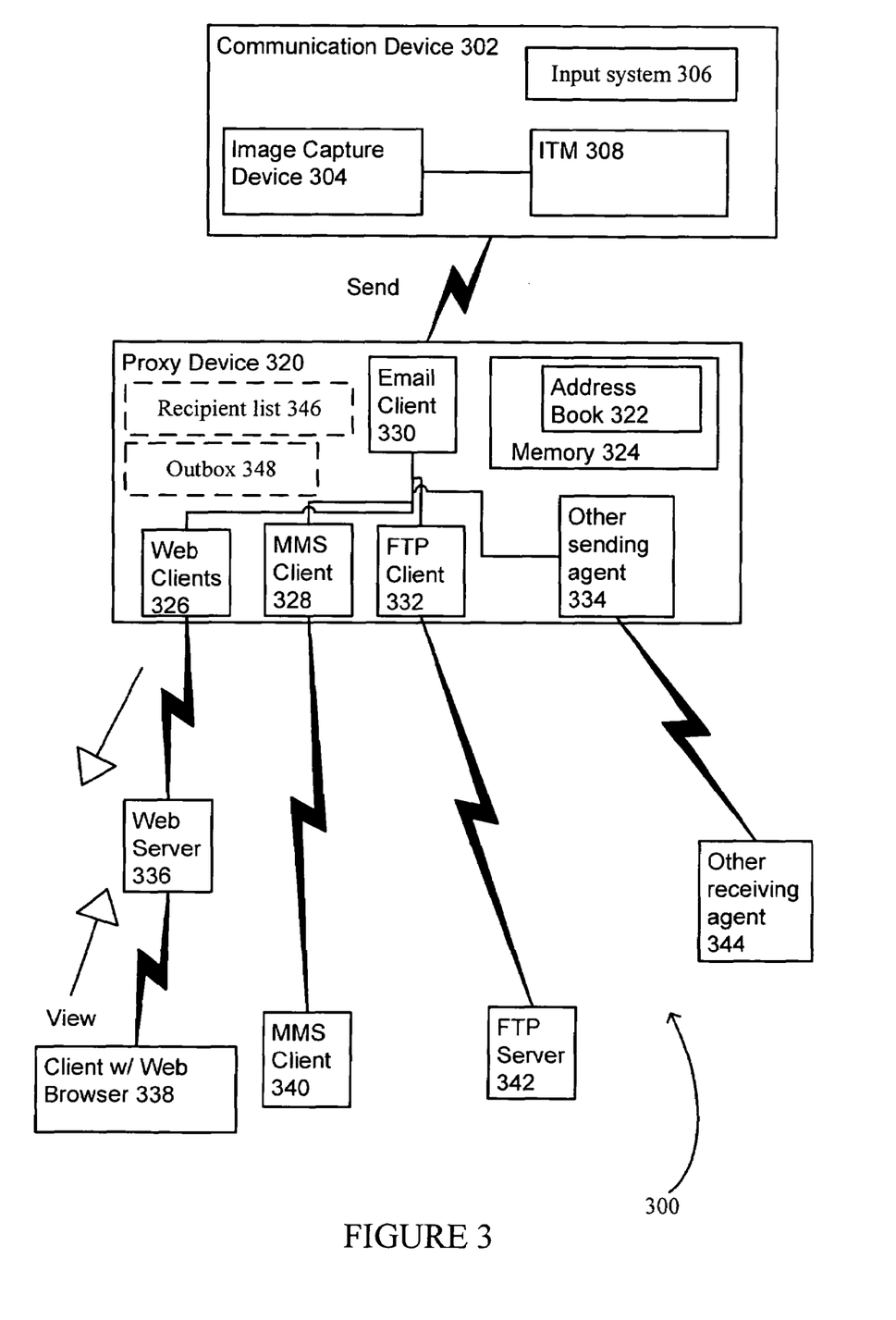
FIG. 3 is a block diagram illustrating one embodiment of a communication system for conveniently sending an image.

FIG. 3 is a block diagram illustrating one embodiment of a communication system 300 for conveniently sending an image from communication device 302 to a recipient through proxy device 320. Communication device 302 may be similar to device 100 in FIG. 1 without an address book. After receiving images from image capture device 304, a user enters an input indicating a recipient into input system 306. Rather than send the images directly to the recipient, the input transmit manager (ITM) 308 first sends the images to a proxy device 320, which then sends the images to a recipient. The images may be sent in a standardized format, for example MMS, with the indicated recipient being a phone number or name, for example.

In this embodiment, proxy device 320 is in wireless communication with communication device 302 and maintains an address book 322 in memory 324. When proxy device 320 receives the image (or images) and the indicated recipient (recipient), proxy device 320 looks up the recipient in address book 322. If the recipient is not listed in the address book 322, then the images may be transmitted by a predetermined format, for example MMS to the phone number indicated. Otherwise, the preferred method of reception may be indicated in the address book 322, for example HTTP, MMS, FTP, email, BLUETOOTH, and so on. Then, proxy device 320 transmits the image using web client 326, MMS client 328, FTP client 332, email client 330, or another sending agent 334.

Depending on the format, the images may be sent to a web server 336 and then to a client with a web browser 338, or to an MMS client 340, for example a mobile phone, to an FTP server 342, or to another receiving agent 344.

ITM 308 may reside on communication device 302 or on proxy device 320. Address book 322 may also reside on either communication device 302 or on proxy device 320.

In another embodiment, input system 306 includes a send image key (not shown) that may automatically transmit an image to an address associated with a recipient that was previously entered. The send image key may transmit an image each time its pressed, or it may transmit several images at once.

In another embodiment, input system 306 includes a send call key (not shown) that may establish a voice channel between the device and an address associated with the recipient, with a phone number as one example of an address associated with the recipient.

Figure 4:
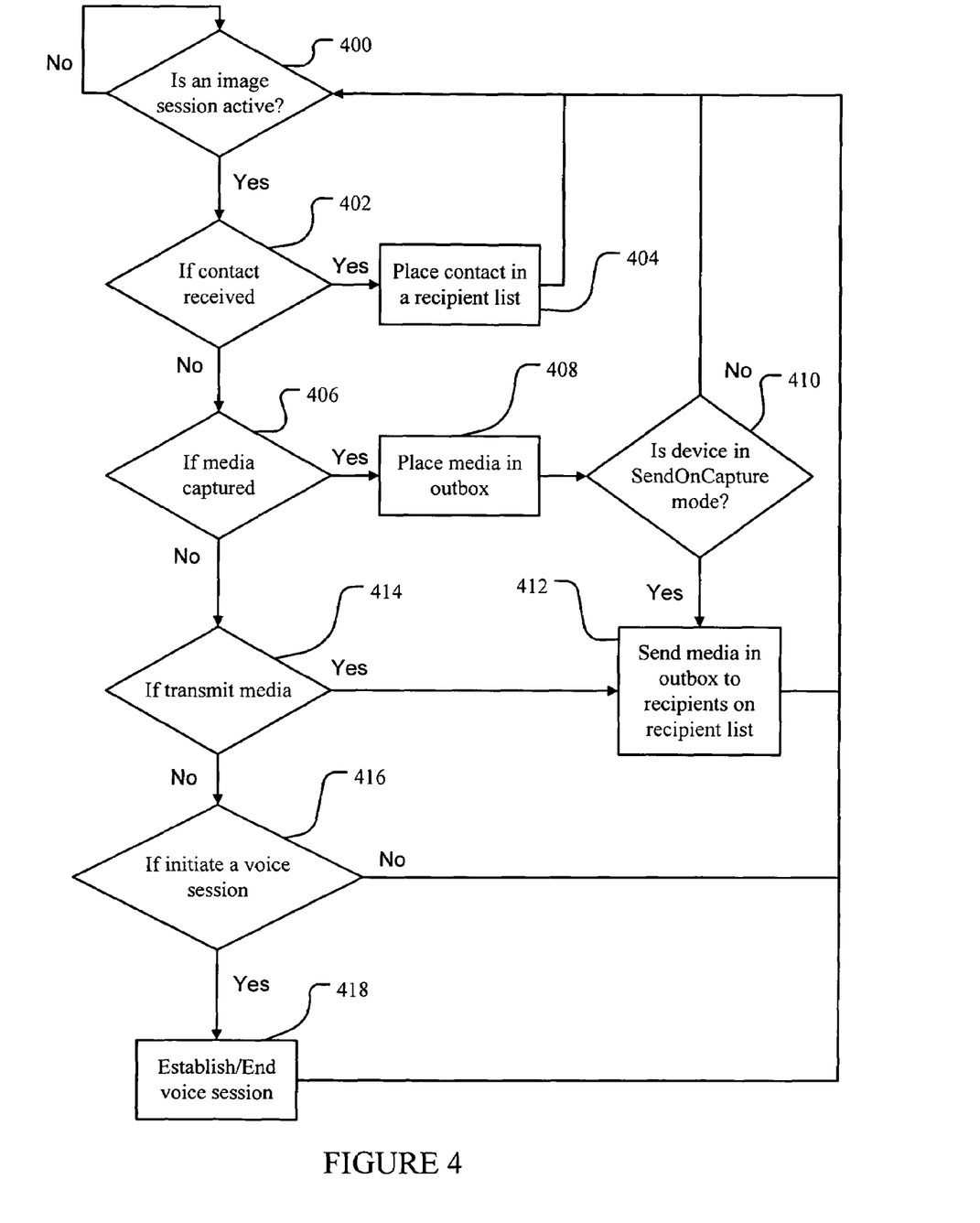
FIG. 4 is a flow diagram illustrating one method of sending an image with the system of FIG. 3.

FIG. 4 is a flow diagram illustrating one method of sending an image with the system of FIG. 3. FIG. 4 will be discussed in conjunction with FIG. 3. In block 400, proxy device 320 may loop until an image session is activated.

In block 402, proxy device 320 determines if a contact has been received. If a contact has been received, then in block 404 proxy device 320 places the contact in a recipient list 346.

If a contact has not been received, then in block 406 the proxy device 320 determines if media has been captured. Media includes, for example, images, video, and audio, for example. If the media has been captured, then in block 408 the proxy device 320 receives the media and places it in outbox 348.

In block 410, proxy device 320 determines if SendOnCapture mode is activated. In SendOnCapture mode, proxy device 320 sends any media captured by communication device 302 (and placed in outbox 348) immediately to any recipients in the recipient list 346. SendOnCapture mode may be engaged or disengaged by a user of communication device 302 or proxy device 320. If SendOnCapture mode is activated, then in block 412 proxy device 320 transmits media in outbox 348 to recipients in recipient list 346.

Following block 406, if media has not been captured, then in block 414, proxy device 320 determines if media is to be transmitted. Proxy device 320 may receive a command from the user of communication device 302 to transmit media, so in block 412 proxy device would send media in outbox 348 to recipients on recipient list 346.

If media is not to be transmitted in block 414, then in block 416, proxy device 320 determines if a voice session is to be initiated. If a voice session is to be initiated, then at some time the voice session is established and ends, in block 418.

Figure 5:
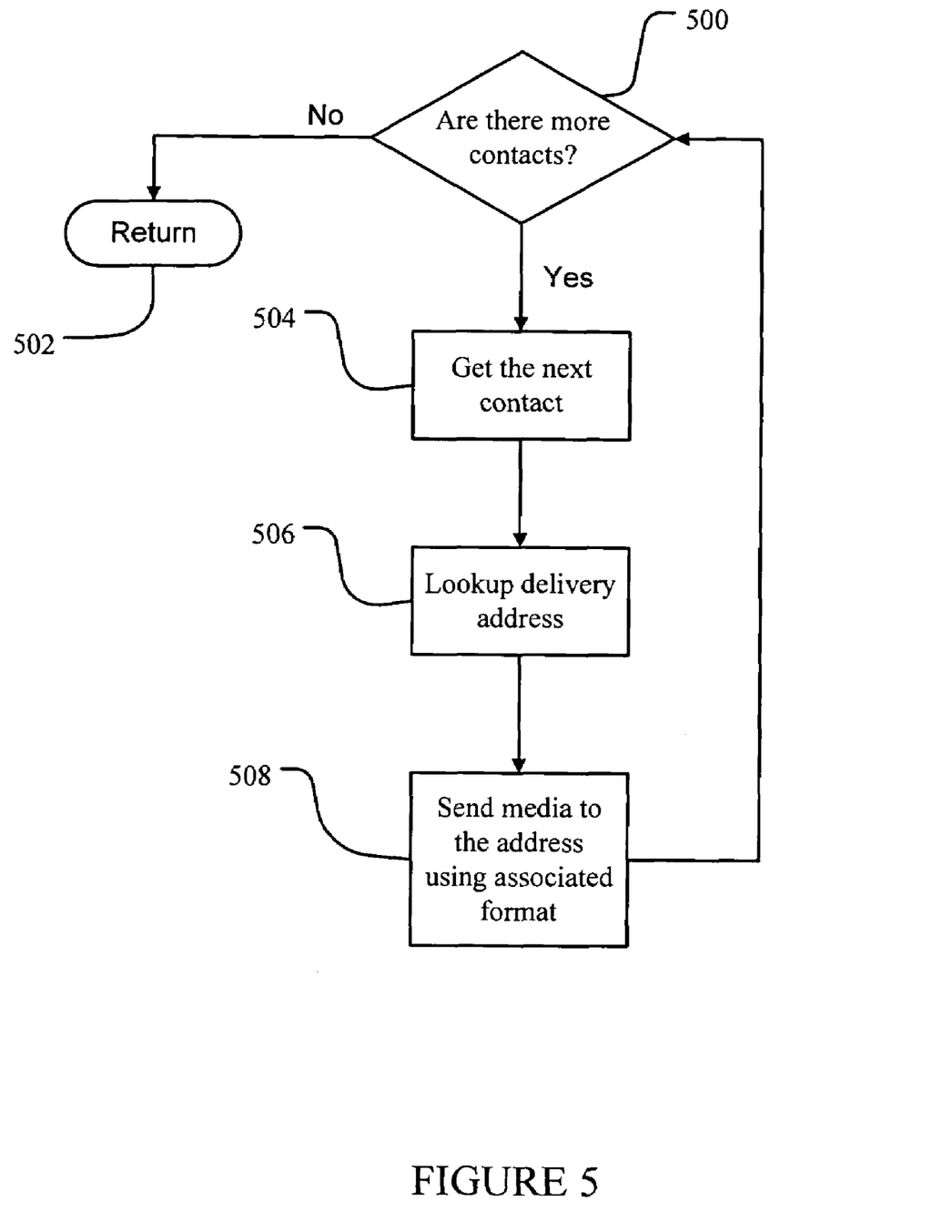
FIG. 5 is a flow diagram illustrating one method of sending an image with the system of FIG. 3.

FIG. 5 is a flow diagram illustrating one method of sending media in outbox 348 to recipients on recipient list 346, as in block 412 of FIG. 4. In block 500, either communication device 302 or proxy device 320 may determine, by querying the user, for example, whether there are more contacts to which media in outbox 348 should be transmitted. If there are no more contacts, then in block 502 control may return to block 412 of FIG. 4.

If there are more contacts, then in block 504, communication device 302 receives the next contact.

In block 506, proxy device 320 may look up the address of the contact in address book 322.

In block 508, proxy device 320 may transmit the media to the contact, using the contact's address and format in the address book 322.

One of ordinary skill in the art will recognize that the method of FIG. 2 may be implemented with system 300 of FIG. 3, while the method of FIGS. 4 and 5 may be implemented with communication device 100 of FIG. 1.

According to the method and system disclosed herein, the present invention allows a user of a communication device to capture an image and send the image from the communication device without the burdens on conventional systems. A user may transmit images in same manner that the user would make a telephone call. During an image session any phone number (for example) that's entered and followed by a press of a 'talk' or 'send' button may automatically transmit the images, without needing to enter any further information, to an email, a phone, an FTP site, and so on.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A communication device comprising:
   an image capture device configured to capture an image;
   a memory coupled to the image capture device and configured to maintain an address book having an address of a recipient and a preferred transmission format for transmitting images;
   an input system coupled to the memory and configured to receive an input indicating the recipient; and
   an image transmit manager coupled to the input system and configured to receive the input and associate the input to the address of the recipient and the preferred transmission format, and in response to associating the input with the address for the recipient, to automatically transmit the image to the recipient using the address and the preferred transmission format.

2. The communication device of claim 1 wherein the image transmit manager is further configured to transmit the image to the recipient using a transmission format associated with the address.

3. The communication device of claim 1 wherein the image transmit manager is further configured to transmit the image to the recipient using a format selected from the group consisting of email, instant messaging (IM), multimedia messaging system (MMS), hyper-text transfer protocol (HTTP), and file transfer protocol (FTP).

4. The communication device of claim 1 further comprising:
a processor coupled to the input system and configured to present a user of the communication device with the option of placing a call to the recipient after transmitting the image.

5. The communication device of claim 1, the input selected from the group consisting of a short-cut key assigned to the recipient, an entry in an address book accessible by the communication device, and one of a list of phone numbers accessible by the image capture device.

6. The communication device of claim 1 further comprising:
a processor coupled to the input system and configured to include with the transmitted image a link having a second address for a sender of the image, wherein the link can be used to establish a voice channel between the communication device and the sender using the second address.

7. A communication device comprising:
an image capture device configured to capture the image;
an input system coupled to the image capture device and configured to receive an input identifying a recipient and a preferred transmission format for transmitting images; and
an image transmit manager coupled to the input system and configured to automatically transmit the image in the preferred transmission format to an address associated with the recipient in response to capturing the image.

8. The communication device of claim 7 wherein the image transmit manager is configured to transmit the image using a multimedia messaging system (MMS) format.

9. The communication device of claim 8 further comprising:
a processor coupled to the input system and configured to present a user of the communication device with the option of placing a call to the recipient after transmitting the image.

10. The communication device of claim 7 wherein the input system is further configured to receive a phone number of the recipient and the image transmit manager is further configured to determine the address associated with the recipient based on the received phone number.

11. The communication device of claim 7 wherein the image transmit manager is further configured to include with the transmitted image a link having a second address for a sender of the image, wherein the link can be used to establish a voice channel between the communication device and the sender using the second address.

12. The communication device of claim 7 wherein the image transmit manager is further configured to determine a transmission format based on the address and to automatically transmit the image in the transmission format.

13. The communication device of claim 12 wherein the transmission format is selected from the group consisting of email, instant messaging (IM), file transfer protocol (FTP), hyper-text transfer protocol (HTTP), and multimedia messaging system (MMS).

14. A method for sending an image from a communication device having an image capture device, comprising:
capturing the image with the image capture device;
receiving an input indicating a recipient;
associating the input with an address for the recipient and a preferred transmission format for transmitting images; and
automatically transmitting the image to the recipient using the address and the preferred transmission format for transmitting images in response to associating the input with the address for the recipient and a preferred transmission format for transmitting images.

15. The method of claim 14, wherein the image is transmitted according to a format associated with the address.

16. The method of claim 14, wherein receiving the input comprises:
receiving a phone number of the recipient.

17. The method of claim 14, wherein receiving the input comprises:
receiving a short-cut key assigned to the recipient.

18. The method of claim 14, wherein receiving the input comprises:
selecting the recipient from an address book accessible by the communication device.

19. The method of claim 14, wherein receiving the input comprises:
selecting the recipient from a list of phone numbers accessible by the communication device.

20. The method of claim 14 further comprising:
presenting a user of the communication device with an option of placing a call to the recipient after transmitting the image.

21. The method of claim 14, comprising:
including with the transmitted image a link having a second address for a sender of the image, wherein the link can be used to establish a voice channel between the communication device and the sender using the second address.

22. A method for sending an image from a communication device having an image capture device, comprising:
receiving an input identifying a recipient a preferred transmission format for transmitting images; and
capturing the image with the image capture device; and
automatically transmitting the image in the preferred transmission format to an address associated with the recipient in response to capturing the image.

23. The method of claim 22, comprising:
receiving a phone number of the recipient; and
determining the address associated with the recipient based on the received phone number.

24. The method of claim 22, wherein automatically transmitting the image comprises:
transmitting the image using a multimedia messaging system (MMS) format.

25. The method of claim 22, wherein automatically transmitting the image comprises:
determining a transmission format based on the address; and
automatically transmitting the image in the transmission format.

26. The method of claim 25, wherein the transmission format is selected from the group consisting of email, instant messaging (IM), file transfer protocol (FTP), hyper-text transfer protocol (HTTP), and multimedia messaging system (MMS).

27. The method of claim 22 further comprising:
presenting a user of the communication device with the option of placing a call to the recipient after transmitting the image.

28. The method of claim 22, comprising:
including with the transmitted image a link having a second address for a sender of the image, wherein the link can be used to establish a voice channel between the communication device and the sender using the second address.

29. A method for sending an image from a communication device having an image capture device, the method comprising:
entering an image capture mode in the communication device, wherein the communication device is configured to capture the image using the image capture device;
receiving an input identifying a recipient and a preferred transmission format for transmitting images while operating in the image capture mode;
associating the input with an address for receiving the image; and
transmitting the image in the preferred tramsmission format to the address associated with the identified recipient.

30. The method of claim 29, wherein when the input identifying the recipient is received before the image is captured, the method comprises:
automatically transmitting the image to the address associated with the identified recipient in response to capturing the image.

31. The method of claim 29, wherein when the input identifying the recipient is received after the image is captured, the method comprises:
automatically transmitting the image to the address associated with the identified recipient in response to associating the input with the address for the recipient.

32. The method of claim 29, comprising:
associating the input with a second address for receiving a voice call; and
establishing a voice channel between the communication device and the recipient using the second address.

33. The method of claim 30, wherein receiving the input further comprises:
receiving a phone number of the recipient.

34. The method of claim 30, wherein receiving the input further comprises:
receiving a short-cut key assigned to the recipient.

35. The method of claim 30, wherein receiving the input further comprises:
selecting the recipient from an address book accessible by the image capture device.

36. A communication device comprising:
an image capture device configured to capture an image during an image capture mode of the communication device;
an input system configured to receive an input indicating a recipient and a preferred transmission format for transmitting images while operating in the image capture mode; and
an image transmit manager coupled to the input system and image capture device and configured to associate the input with an address for the recipient and to automatically transmit the image in the preferred transmission format to the address.

37. The device of claim 36, wherein the image transmit manager is further configured to automatically transmit the image to the address in response to capturing the image when the input identifying the recipient is received before the image is captured.

38. The device of claim 36, wherein the image transmit manager is further configured to automatically transmit the image to the address associated with the recipient in response to associating the input with the address for the recipient when the input identifying the recipient is received after the image is captured.

39. The device of claim 36, wherein the input system further comprises a send image function, the image transmit manager further configured to automatically transmit the image to the address associated with the recipient in response to an activation of the send image function.

40. The device of claim 39, wherein the input system further comprises a send call function, the device further configured to establish a voice channel between the device and the address associated with the recipient in response to an activation of the send call function.

41. The device of claim 39, wherein the input system further comprises a send call function, the image transmit manager further configured to associate the input with a second address for receiving a voice call, and to establish a voice channel between the device and the second address associated with the recipient in response to an activation of the send call function.

42. The device of claim 36 further comprising:
a memory coupled to the image transmit manager and accessible by the image capture device, the memory configured to maintain an address book including a name of the recipient and the associated address for the recipient.

43. A computer-readable medium containing programming instructions for sending an image from a communication device, having an image capture device, the programming instructions comprising:
capturing the image with the image capture device;
receiving an input indicating a recipient;
associating the input with an address for the recipient and a preferred transmission format for transmitting images; and
automatically transmitting the image to the recipient using the address and the preferred transmission format for transmitting images in response to associating the input with the address for the recipient and the preferred transmission format for transmitting images.

44. A computer-readable medium containing programming instructions for sending an image from a communication device, having an image capture device, the programming instructions comprising:
capturing the image with the image capture device;
receiving an input identifying a recipient and a preferred transmission format for transmitting images; and
automatically transmitting the image in the preferred transmission format to an address associated with the recipient in response to a capturing of the image by the image capture device.

45. A computer-readable medium containing programming instructions for sending an image from a communication device, having an image capture device, the programming instructions comprising:
entering an image capture mode in the communication device, wherein the communication device is configured to capture the image using the image capture device;

receiving an input identifying a recipient and a preferred transmission format for transmitting images while operating in the image capture mode;

associating the input with an address for receiving the image; and transmitting the image in the preferred transmission format to the address associated with the identified recipient.

* * * * *

UNITED STATES PATENT AND TRADEMARK OFFICE
CERTIFICATE OF CORRECTION

PATENT NO. : 7,376,699 B2  Page 1 of 1
APPLICATION NO. : 11/003849
DATED : May 20, 2008
INVENTOR(S) : Robert P. Morris It is certified that error appears in the above-identified patent and that said Letters Patent is hereby corrected as shown below:

Column 8, line 40, after "recipient" insert --and--

Signed and Sealed this

Twenty-fifth Day of November, 2008

JON W. DUDAS
*Director of the United States Patent and Trademark Office*